United States Patent [19]

Staudenrausch

[11] 4,347,646
[45] Sep. 7, 1982

[54] METHOD AND APPARATUS FOR SEQUENTIAL PORTIONING OF A PLASTICALLY DEFORMABLE MASS, IN PARTICULAR SAUSAGE STUFFING

[75] Inventor: Georg Staudenrausch, Biberach, Fed. Rep. of Germany

[73] Assignee: Albert Handtmann GmbH & Co., Biberach, Fed. Rep. of Germany

[21] Appl. No.: 109,205

[22] Filed: Jan. 4, 1980

[30] Foreign Application Priority Data

Jan. 9, 1979 [DE] Fed. Rep. of Germany ....... 2900585

[51] Int. Cl.³ ............................................. A22C 11/08
[52] U.S. Cl. ............................................. 17/49; 17/37; 222/55
[58] Field of Search ............ 83/367, 369; 17/33, 17/34, 35, 36, 37, 38, 49; 222/14–22, 55

[56] References Cited

U.S. PATENT DOCUMENTS

| | | | |
|---|---|---|---|
| 3,303,967 | 2/1967 | Munson | 222/14 |
| 3,524,371 | 8/1970 | Kröger et al. | 83/369 |
| 3,538,726 | 11/1970 | Cook | 83/369 X |
| 3,743,140 | 7/1973 | Sauerbrey | 222/70 X |
| 3,769,657 | 11/1973 | Müller | 17/35 |
| 3,995,517 | 12/1976 | Smith | 83/367 X |
| 3,997,941 | 12/1976 | Müller | 17/37 X |
| 4,208,933 | 6/1980 | Skidmore | 83/367 |

FOREIGN PATENT DOCUMENTS 1128782 4/1962 Fed. Rep. of Germany .......... 17/35

Primary Examiner—Willie G. Abercrombie
Attorney, Agent, or Firm—Montague & Ross

[57] ABSTRACT

A pickup 21 is connected with a portioning element that carries out individual portioning operations between two portioning pauses. By means of a sensor 22 and a counter 29 the actual values of the portioning operation steps are measured and are compared in a comparator 35 with a desired value from a desired-value setter 30. When the actual value reaches the desired value the programmed controller 27 for the next portioning operation and simultaneously the counter 29 is reset via the line 38. Thus the overrun of the portioning element after switching off is counted for the next portion. With each difference between desired value and actual value of a preceding portioning operation thus effectively the remaining desired value for the next portioning step is corrected.

11 Claims, 5 Drawing Figures

METHOD AND APPARATUS FOR SEQUENTIAL PORTIONING OF A PLASTICALLY DEFORMABLE MASS, IN PARTICULAR SAUSAGE STUFFING

FIELD OF THE INVENTION

The invention relates to a method for the sequential portioning of a plastically deformable mass, in particular sausage stuffing, wherein a portioning element discharging the individual portions is advanced forwardly stepwise according to a predetermined control value.

BACKGROUND OF THE INVENTION

A method of this type is known from German Pat. No. 2,002,100. It shows a hydraulically driven sausage-filling and -twisting machine whose hydraulic motor is controlled by a rotary servovalve. The servovalve is set stepwise by a servomotor and the hydraulic motor follows the predetermined control displacement. Since the rotation angle of the hydraulic motor is proportional to the volume of the discharged mass very good accuracy is obtained. As a result of the displacement following procedure this arrangement can only be used with a hydraulic drive and with relatively great expense for the controls.

In any situation where the portioning operation is initiated and ended by control commands the volumetric accuracy of the filling operation is largely determined by the overrun, that is the amount discharged between the shutoff command and the complete stopping of the portioning element. The size of this overrun mass is dependent on several factors, but mainly on the stepping speed or filling speed, and also on the type and makeup of the drive, the working temperature, the cleanliness of the equipment, wear of the drive parts and the like. Above all when the dosing is carried out by measuring the time between the switch-on and switch-off command, it is necessary periodically to carry out monitoring measurement and to correct the setting if adequate portioning accuracy is to be obtained. Even so, the set control value remains constant for a certain time. If in the meanwhile the operating conditions change, the thus created deviations in the filling operation remain until the next monitoring and changing of the control value.

OBJECT OF THE INVENTION

The object of this invention is to improve upon this method so that, even with relatively great portioning speed at high stepping speed, deviations can be immediately compensated for from a preceding portion size.

SUMMARY OF THE INVENTION

In order to obtain this object according to the invention the control value for the individual steps is varied in accordance with deviation between desired and actual values at least of an immediately preceding step used as a reference. This control can be based on the length of the control signal, but relates above all to the actual position of the stop or switch-off signal in relation to the current portion. One can compensate for the deviation immediately or at a later time, fully or only partially, as for example 80%, with the compensation taking place not on the measured portion, but on the following portions, so that one meanwhile takes into account deviations of any individual portions. This is, without substantial significance for sausage-stuffing machines, since here the deviations are scarcely instantaneous, but practically only appear as slow changes in the working conditions, as for example, a change of the temperature, the makeup of the mass in portions, the wearing of a machine part, or the like. In order to eliminate all possible measuring inaccuracies it is also possible to proceed with a change of the control value when in several subsequent portions a predetermined equal deviation is noticed.

It is simpler yet, according to the instant invention, when the control value for each step is varied only in accordance with the deviation between the desired (set-point) and actual values of the immediately preceeding step. This necessitates only measuring and equalizing, with the variation being changed directly in the control value which does not have to be stored. Changes appearing over several portions are translated into small changes which themselves are compensated for in the next portion immediately.

The steps are preferably measured by means of a parameter proportional to the discharge volume. This can be an angular motion or a sliding motion of a portioning element, or a value proportional thereto.

It has proven particularly advantageous to continuously directly or indirectly sense the displacement of the portioning element and trigger the end of the step when the actual value of the step is less by the overrun of the preceeding step than the desired value. The following step is thus controlled itself according to the values of the immediately preceeding step so that, assuming other things remain the same, overrun is obtained and the portioning element actually comes to a stop when a portion of the predetermined size is discharged.

Measuring and controlling are greatly simplified in that the measuring of the discharge path of the following portion is started as soon as the actual value of the preceeding portion has reached the desired value. Thus, also in no way are calculations necessary in order to control any changes. One must only be sure that the measured values agree with the actually portioned values, that is the ratios agree or the arrangement is properly adjusted or calibrated. If, for example, for a desired or set-point value of 100 cm$^3$, the first portion has a value of 110 cm$^3$ thus at 100 cm$^3$ the measuring of the difference for controlling the following portion is started. Since the overrun of 10 cm$^3$ of the first portion is counted in the second portion, this is actually stopped at 100 cm$^3$ as long as the other characteristics remain constant. If one measures all of the portions exactly it is sufficient to only separate out the first portion and to disregard it. In the second portion one begins to count with 11 units or to count further when the first volume unit is reached. When one counts to 110 units and switches, only 90 units is discharged. With a constant overrun of 10 cm$^3$ (10 units) the portion is actually completed after switchover at 100 units. With stepping speeds of, for example, 300 units/min five corrections are made per second. The corrections taken in 0.2 seconds in any case lie well within the portion tolerance since for example in sausage-filling machines changes only take place in a larger time span.

The invention further relates to an apparatus for sequentially portioning a plastically deformable mass, in particular sausage stuffing, with a stepwise advancing portioning element whose step size is at least proportional to the volume discharged with the step and is variable by means of a predetermined control value, wherein according to this invention a measuring device for continuously measuring a value proportional to the volume of the discharged mass, a comparator for continuously comparing the desired and actual values, and a controller for controlling the ending of a step and for switching the measuring over for the following step on reaching of a predetermined comparative value are provided.

The measuring device has at least indirectly on its input side a pickup, a sensor connected thereto, and a measuring device connected thereto and connected through the comparator with a desired-value setter. In principle it is also possible to measure in an analog manner so that an adjustable capacitor is charged in such a manner that its voltage is proportional to the discharged portion, with a braking or switchover step triggered on reaching a desired-value voltage.

It seems simpler and easier nonetheless to form the pickup as a pulse generator and a measuring device as a digital counter, with preferably the desired-value generator also formed digitally. Thus it becomes unimportant if the predetermined value is counted backward or forward. It is essential that the switchover be ensured when a predetermined number is reached which for example corresponds to the volume of the discharged portion in cm$^3$.

According to a suggestion of the invention the pickup is rotatably mounted and is operated in relationship to the portioning element so that a rotation of the pickup corresponds to a unit of volume of the discharged mass or to a whole-number multiple of such a unit of volume.

With the hydraulically driven portioning element there need not even be a mechanical drive connection for the pulse generator. The drive is realized by a fluid machine switched into the drive circuit. This can be the drive hydraulic motor or a pump in closed-circuit connection therewith, but is better yet a separate small hydraulic motor which drives the pulse generator like a liquid meter.

For most applications it is possible to make do with a fixed connection without any change possibilities. Nonetheless it is advantageous to be able to set variable values or different references such as a volume, mass, or weight easily. At least in this case it is advantageous to provide between the drive for the pickup and the setting device an adjustment means for agreeing the units of the actual and desired values. Such means can also be advantageous when preparation inaccuracies must be compensated for.

The adjustment means can for example be formed as a steplessly variable transmission in driving engagement with the pickup or as an electrical converter between the measuring device and the setting device.

SPECIFIC DESCRIPTION

Figure 1:
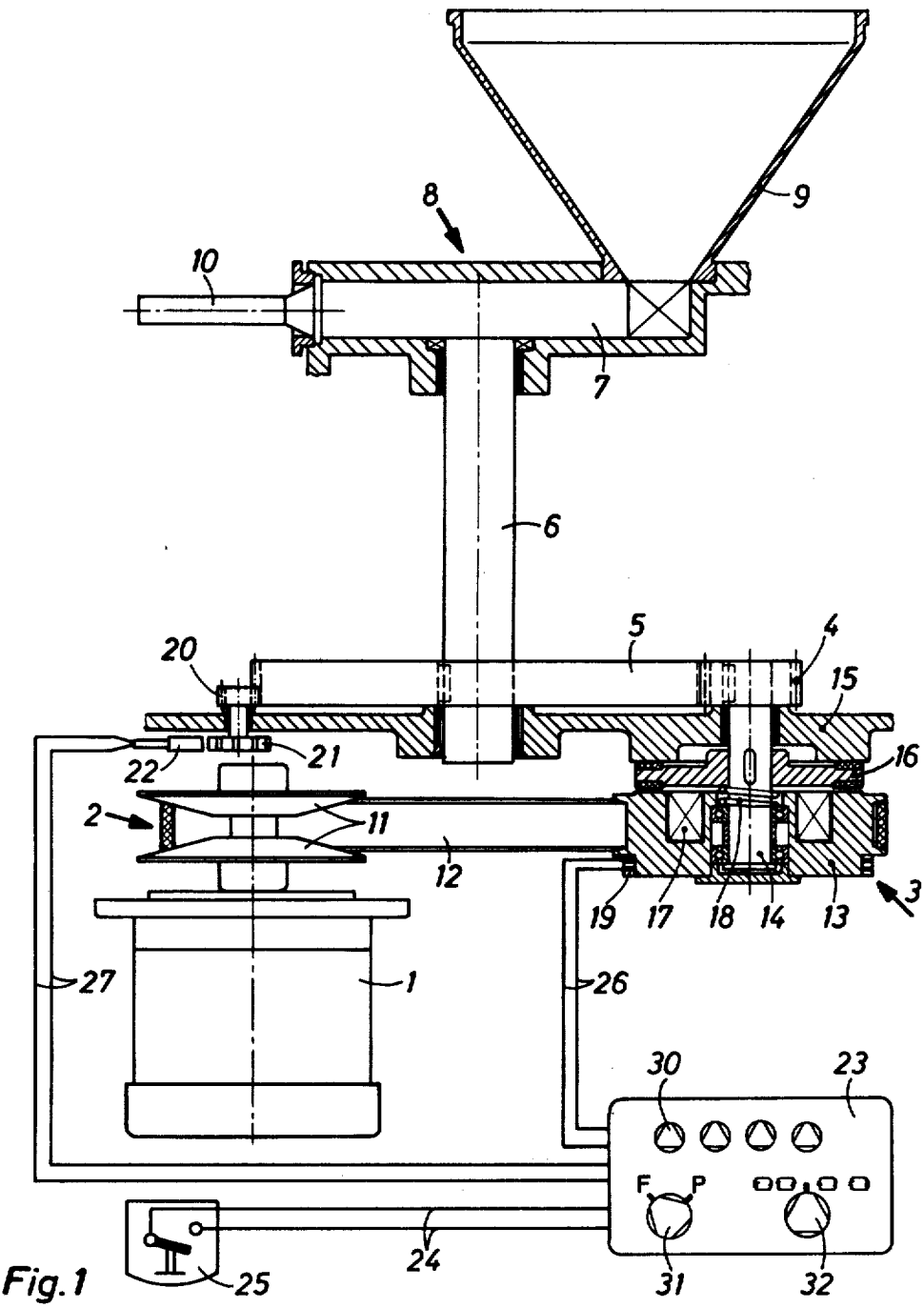
FIG. 1 is a schematic representation a portioning apparatus according to the invention.

According to FIG. 1 a drive motor 1 constituted as an electric motor drives, via a variable transmission 2, a magnetic clutch 3, a pinion 4, and a gear 5, a pump shaft 6 which carries a portioning element 7 of a feeder 8 and constituted as a pump wheel. This feeder is here the stuffing pump of a sausage-stuffing machine which is loaded with filling in a funnel 9 and which discharges it stepwise into the form of individual portions in a stuffing tube 10 or the like.

The variable transmission 2 includes two tapered disks 11 which are displaceable axially relative to each other for changing the transmission ratio and which drive a drive pulley 13 of the magnetic clutch 3 via a V-belt 12. This pulley is rotatably mounted by means of roller bearings on a shaft 14 carrying the pinion 4. Between the drive pulley 13 and a housing part 15 is a clutch disk 16 mounted for joint rotation with and longitudinal sliding on the shaft 14 and which serves as the pole piece for a magnetic coil 17 mounted in the drive pulley 13 and which is pressed against the housing part 15 by a helical spring 18 mounted on the shaft 14. When the magnetic clutch is not electrically energized the coupling disk and with it the portioning element or pump wheel 7 of the feeder 8 are fixed against the housing part 15. If however the magnetic coil 17 is energized via the commutator rings 19 the coupling pulley 16 is drawn by magnetic force toward the drive pulley 13 and thereby couples the feeder 8 during the switched-on time of the coil with the drive.

Meshing with the gear 5 is a pinion 20 which is rotatably mounted on the housing part 15 and which is fixed on a disk-shaped pickup 21 at whose periphery is provided a sensor 22. The pickup 21 has on its periphery ten angularly equispaced teeth which create, as they pass the sensor 22, pulses fed via the conductors 27 to a controller 23 that is connected via conductors 24 with a switch 25 constituted for example as a knee-operated switch and which is connected via conductors 26 with the commutator rings 19 of the magnetic clutch 3. The controller 23 includes a desired-value generator 30 with adjustment knobs for four decades, a function setter 31 with a setting F=fill and P=portion and a pause setter 32 for setting the rest time between two ejection operations.

A four-position digital counter 29 (FIG. 2) serves as a measuring device which counts the signals entering the conductors 27 from the pickup 21 and thereby counts the number of rotations of the pickup. The movement ratio between the pickup and the portioning element is such that each volume of a cubic centimeter of material discharged from the stuffing tube 10 corresponds to one-tenth of a rotation of the pickup 21 so that for each cubic centimeter a pulse is sent to the counter 29.

It is understood that other ratios or relationships can be chosen, that the pickup 21 can have another shape such as that of a drum and can be provided on its periphery with a plurality of equispaced permanent magnets or other elements that can create signals.

Figure 2:
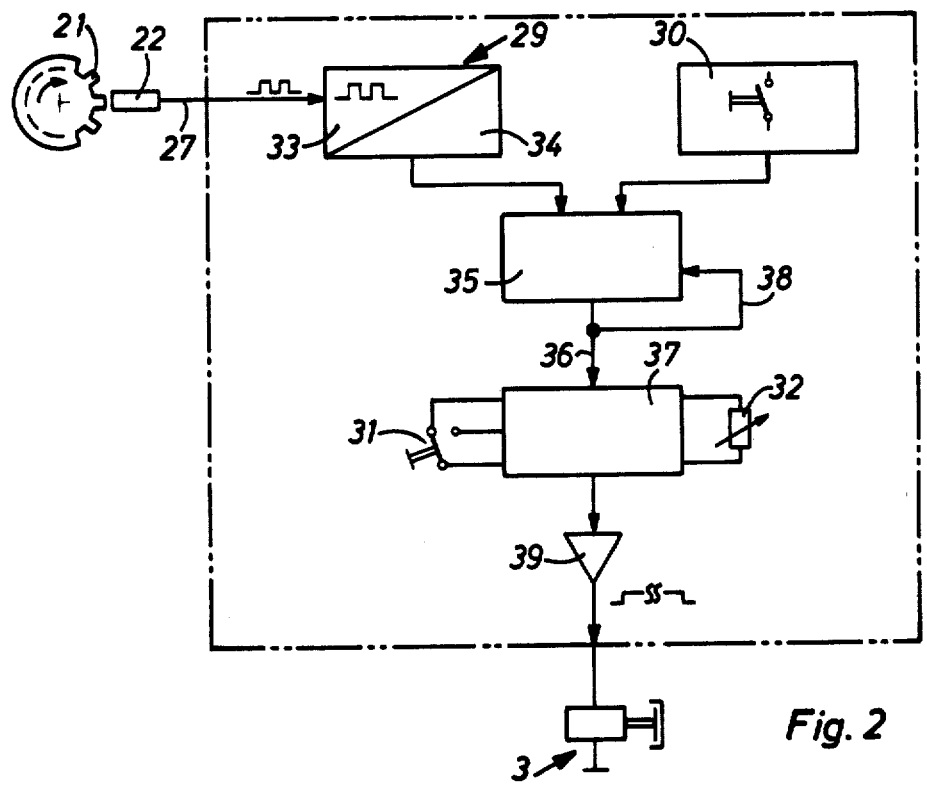
FIG. 2 is a corresponding block diagram.

As can be seen from FIG. 2 the counter 29 has a binary stage 33 and a decimal stage 34. The decimal stage is, like the decimal desired-value generator 30, connected to a comparator 35 which when stepped to the desired value by the actual-value counter 29 sets the program controller 37 in operation via the line 36 and resets the counter 29 via the line 38, therefore resetting itself for counting or measuring of the next portion. The magnetic clutch 3 and via it the portioning element 7 are switched off or stopped via an amplifier 39 and after running-out of the pause time set in the pause setter 32 a start command is fed to the clutch 3 and thereby a new portioning operation is effectively started.

Now not only is the counter reset via the line 38 but simultaneously a new counting operation is started, meanwhile at first the portioning apparatus 37 effects the shutting-off of the clutch with a delay via the amplifier 39, the delay being electrical and being added to the braking time. During all of these times the portioning element 7 runs a bit further, advancing material which is already counted for the next position. Thus material advanced during the switching time is counted for the next portion rather than for the last one.

Figure 3:
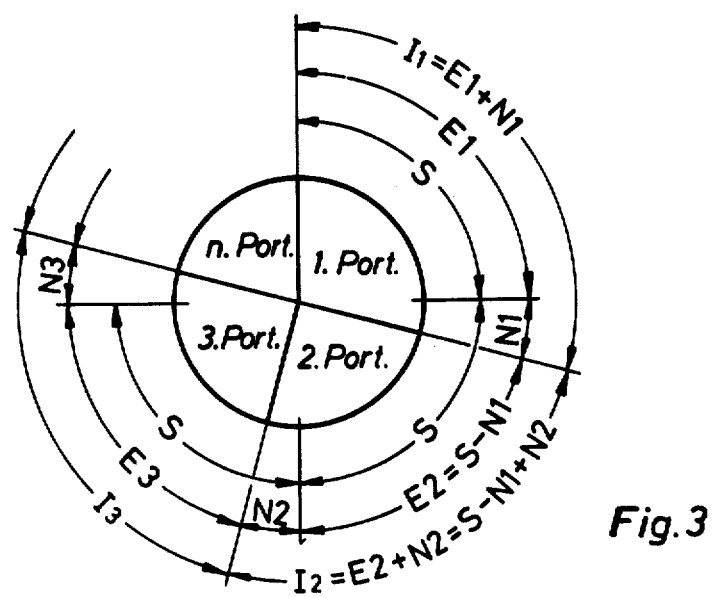
FIG. 3 is an angular diagram.

In the angular diagram of FIG. 3 one can see that each angular degree for example with respect to the rotation angle of the portion element 7 corresponds to a cubic centimeter of extruded mass. Each portion should be filled with 90 cubic centimeters. Thus the desired value S equals 90° which equals 90 cm$^3$.

The first portion is made without any correction, that is as the portioning element 7 starts the counter starts to count $E_1 = S = 90$. At the end of this operation a new counting operation for the second portion is started. The portioning element 7 continues to move and runs to the operation $N_1 = 10°$ further. Altogether an actual portion $I_1$ equals $E_1 + N_1$ equals $S + N_1$ is extruded.

Since for the next portion already $10° = N_1$ has been counted, the device is switched off after $E_2 = S - N_1 = 80° = 80$ cm$^3$. The filling time extends as shown at $N_2$. Thus the second portion consists of $I_2 = E_2 + N_2 = S - N_1 + N_2$.

This equation shows that $I_2$ corresponds with the desired value S when the two overrun values $N_1$ and $N_2$ are the same. This is the case when at the end of the first portion the maximum speed is obtained. In practice it can be assumed that $N_2$ varies by less than 20% from $N_1$, that is by less than 2 cm$^3$ = 2.2% S. The maximum deviations are comparable, so long as during the operation the speed is varied. Since such variations lie in sausage-stuffing machines well inside the tolerance limits, it is therefore sufficient to separate out the first portion when starting up.

A requirement for this control accuracy is naturally that each pulse corresponds to the selected quantity. When this is not the case or when other measuring units are used it is possible to use some adjusting means between the drive for the portioning element and the desired-value setter. For example it is possible to connect up the pickup 21 via a steplessly variable transmission or to use a ratio of actual to desired values in the comparator 35 which is different from 1:1.

Figure 4:
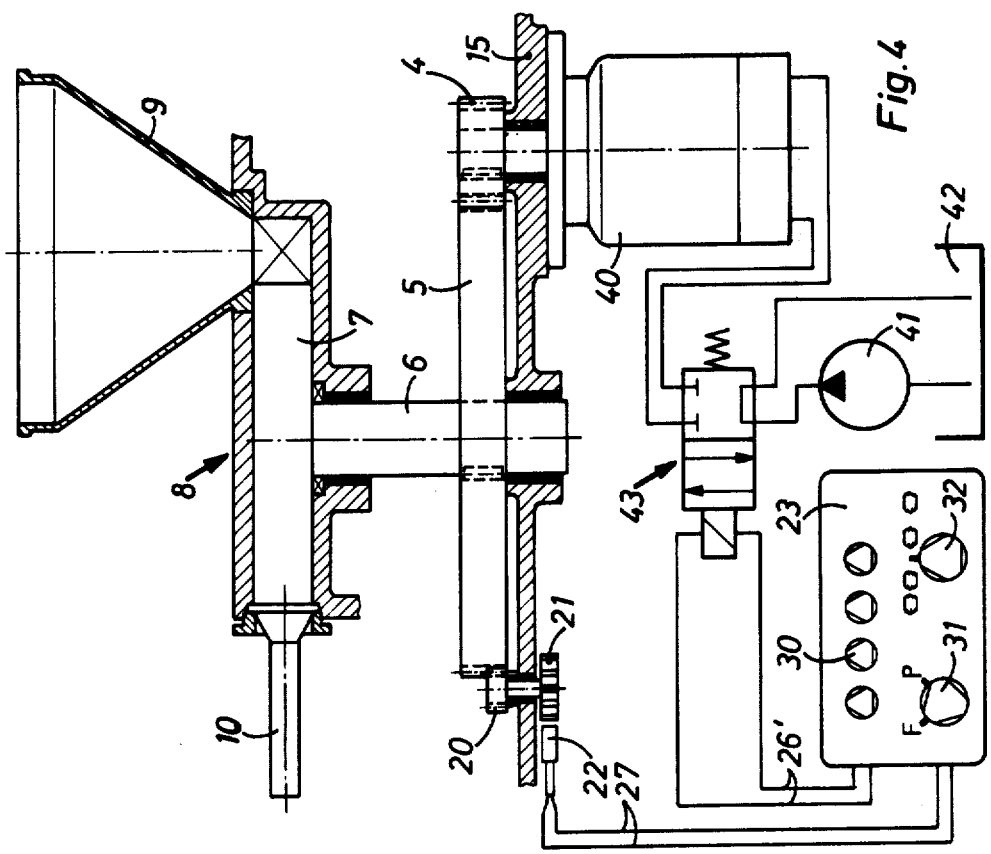
FIG. 4 is a variation of the arrangement shown in FIG. 1 with a variable hydraulic drive motor.

In the arrangement of FIG. 4 the pinion 4 is mounted directly on a hydraulic motor 40 which is fed with oil from a reservoir 42 by a pump 41 and which is controlled via a magnetic slide valve 43 and line 26'; instead of a slide valve it is also possible to use a plate valve or other control element.

Figure 5:
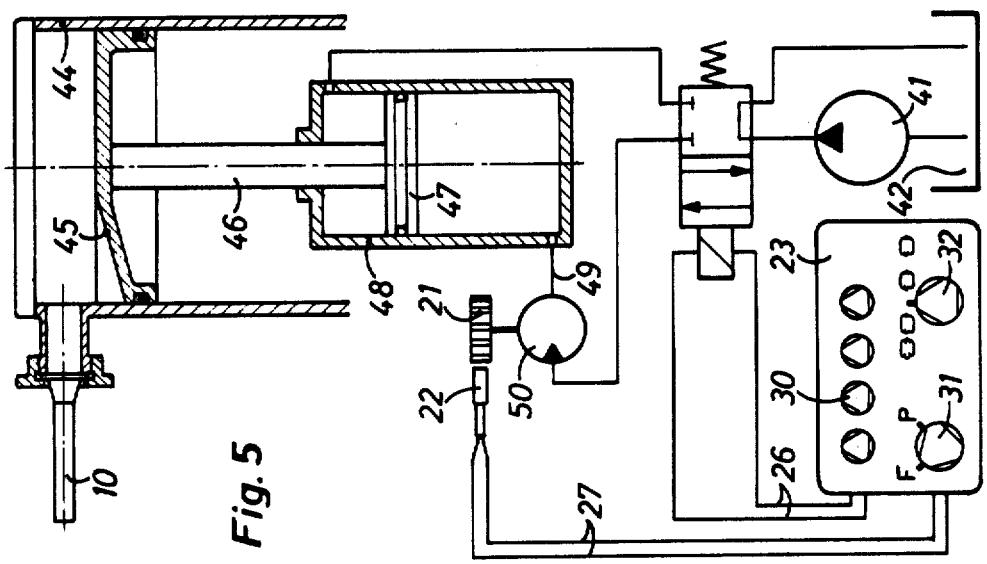
FIG. 5 a further variation of this arrangement with a filling cylinder.

A further embodiment is shown in FIG. 5. Here the stuffing tube 10 is fed from a stuffing cylinder 44 by a stuffing piston 45 which is rigidly connected by a piston rod 46 with a hydraulic piston 47 in a hydraulic cylinder 48. Here the piston arrangement is advanced stepwise in the same manner as the hydraulic motor 40 of FIG. 4 is turned. It is also simultaneously basically possible to drive a pickup for example directly by the stuffing piston 45. As there nonetheless the adjustment size is too small the pressure line 49 from the pump 41 is provided with a small hydraulic motor 50 for driving the pickup 21.

In the illustrated embodiments only an extremely simplified control arrangement is shown. In comparison to the desired reaction speed it is possible to achieve extraordinarily great portioning accuracy which, with uniform speed and the normally slowly changing operating conditions, lie in the neighborhood of a few units such as 1 cm$^3$. If this is not sufficient it is possible to employ a smaller measuring unit or even to draw on further values for an additional control.

I claim:

1. In a method of portioning a deformable flowable mass, especially sausage stuffing, which comprises displacing and compressing the mass in successive steps along a flow path with a portion of the mass being discharged from said flow path with each of a succession of compression steps by a movable compression member whereby the discharged portion amounts to a desired volume which can be augmented by an overshoot volume, the improvement which comprises the steps of:
   (a) terminating the movement of said member for one of said compression steps at a first desired volume and measuring the overshoot volume resulting therefrom;
   (b) establishing a second desired volume as the difference between the first desired volume and the measured overshoot volume;
   (c) terminating the movement of said member for the next compression step at said second desired volume; and
   (d) repeating steps (a) through (c) for the successive compression steps following said next step.

2. The improvement defined in claim 1 wherein the displacement of said member is measured to provide an output signal representing said overshoot volume.

3. In an apparatus for portioning a deformable flowable mass, especially sausage stuffing, wherein a portioning element is displaceable in a stepwise manner to displace and compress said mass along a flow path with each compression step of a succession thereof whereby the discharged portion amounts to a desired value corresponding to a set point value displacement of said element augmented by an overshoot volume resulting in a total discharge volume corresponding to an actual value displacement of said element, the improvement which comprises:
   (a) means for measuring an overshoot value of displacement of said element upon inactivation of said element in one of the compression steps thereof at the corresponding set point value;
   (b) means for forming a second set point value from the difference of said corresponding set point value and the measured overshoot value; and
   (c) means for terminating displacement of said element in the next compression step of said second set point value.

4. The improvement defined in claim 3 wherein said apparatus is provided with comparator means for continuously comparing said set point values with corresponding actual values, said comparator means provided with means for resetting said measuring means to a starting value upon coincience of the set point value and the actual value of a preceding step.

5. The improvement defined in claim 4, further comprising signal generator means operatively connected to said element for generating a train of signals representing the displacement of said elements, said signal generator means being connected to said comparator means, means for applying a signal representing an initial set point value connected to said comparator means.

6. The improved defined in claim 5 wherein said measuring means includes a pulse counter.

7. The improvement defined in claim 5 wherein said signal generator comprises a rotatable member operatively connected to said element such that each rotation of said member represents an integral number of volume units of the desired volume per portion.

8. The improvement defined in claim 5 wherein said element is a hydraulically displaceable ram, said signal generator means including a hydraulic motor connected in a hydraulic circuit for said ram.

9. The improvement defined in claim 5, further comprising adjusting means connected between said signal generator means and the signal applying means for agreement of the units of the actual and desired values delivered to said comparator means.

10. The improvement defined in claim 9 wherein said adjusting means is a transmission with a stepless transmission ratio connected to said signal generating means.

11. The improvement defined in claim 9 wherein said adjusting means is an electronic converter connected between said measuring means and the signal applying means.

* * * * *